Sept. 28, 1948.  M. SKOLNIK  2,450,258
PLASTIC COMPOSITION AND WALLBOARD MADE THEREFROM
Filed Dec. 22, 1945

INVENTOR.
Max Skolnik
BY
Evans & McCoy
ATTORNEYS

Patented Sept. 28, 1948

2,450,258

UNITED STATES PATENT OFFICE 2,450,258

PLASTIC COMPOSITION AND WALLBOARD MADE THEREFROM

Max Skolnik, Chicago, Ill., assignor to Fibro-Mold Specialties, Inc., Chicago, Ill., a corporation of Illinois Application December 22, 1945, Serial No. 636,674

8 Claims. (Cl. 106—107)

This invention relates to plastic compositions and more particularly to a self-hardening cement composition.

The invention has for an object to provide an elastic, dough-like composition that can be kneaded or shaped by hand, that is adapted to be extruded or rolled into sheets or bars, that will set to solid form and that can be bent or molded as desired prior to setting.

A further object of the invention is to provide a plastic, moldable cement composition which when set is soft enough to receive nails or screws or to be cut like wood, and which has sufficient strength and elasticity to enable it to be used as a structural material for walls, furniture and the like.

An additional object of the invention is to provide a dough-like composition that will retain its plasticity indefinitely, but which can be converted into a self-hardening composition by kneading magnesite into the plastic mass.

I have discovered that rye flour mixed with sufficient concentrated magnesium cloride solution (22° to 30° Baumé) to form a stiff dough is an elastic, easily workable plastic which can be molded by hand like modeling clay and which retains its plasticity indefinitely. A small amount of oil such as Vaseline may be added to the composition to reduce stickiness, and sufficient pigment may be incorporated in the composition to give it the desired color.

When magnesite either in its natural state or calcined, i. e. in the form of magnesium carbonate or magnesium oxide, is worked into the dough-like material, a composition is formed which will harden by the setting of the magnesium oxychloride cement formed by the mixture of magnesite with magnesium chloride. It is desirable that the amount of magnesite added should at least equal by weight the amount of rye flour in the composition.

The desired plasticity can be retained in the material to which the magnesite has been added by the addition of sufficient hot water or magnesium chloride solution to maintain the desired plasticity so that after the magnesite is added the material may be rolled, extruded, pressed or molded into the desired shape prior to hardening. Material thus formed has a smooth finish but is much softer and less brittle than ordinary hydraulic cement compositions. The plastic rye flour magnesium chloride dough can be mixed with magnesite powder by kneading the powder in by hand, by mixing in a mixing machine such as used for mixing dough in bakeries, or by means of rolls such as employed in rubber mixers.

The permanently plastic dough may be stored and shipped in barrels or other suitable containers so that the desired quantities of self-hardening plastic may be prepared for use by merely kneading into the plastic composition the required amount of magnesite. The plastic moldable self-hardening composition may, however, be prepared by mixing together all of the ingredients in one operation.

When the proper proportions of magnesite, magnesium chloride and rye flour are mixed together a plastic dough-like mass will be formed which is capable of being shaped or molded as above described. It is preferred that the rye flour be mixed with from one to three times its weight of magnesite and that sufficient magnesium chloride solution (22° to 30° Baumé) be added to produce a plastic mass of the desired consistency.

Various fillers such as silica flour, talc, wood flour or plaster of Paris which do not interfere with the setting of the cement may be added and, if desired pigments may be added in the amounts necessary to give the product the desired color. The use of plaster of Paris has been found to be advantageous because of its ability to absorb any surplus liquid.

A highly satisfactory composition has been made with the ingredients in the following proportions: rye flour 25#, magnesite 50#, plaster of Paris 50#, and a substantially equal weight of magnesium chloride solution (22° to 25° Baumé).

It has been found that the composition of the present invention forms a very satisfactory facing for insulating board, providing a smooth surface coating that firmly adheres to the fibrous board, this coating being hard enough to provide a satisfactory wall finish, but soft enough to permit nails or screws to be driven through the coating and board.

Figure 1:
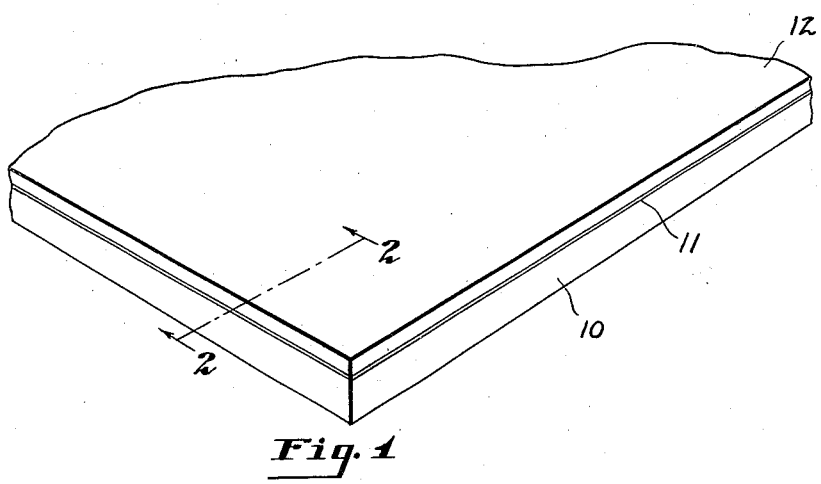
Figure 1 is a fragmentary perspective view of wall board embodying the invention.
Figure 2:
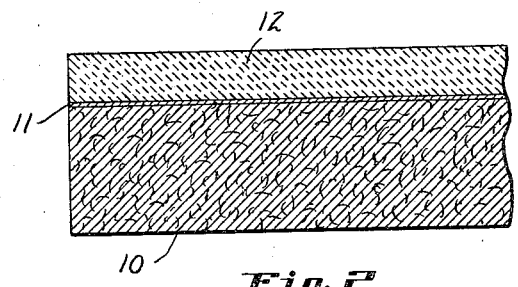
Fig. 2 is a fragmentary section taken on the line indicated at 2—2 in Fig. 1.

Referring to the accompanying drawings, the wall board consists of a sheet of insulation material 10 which may be composed of paper fibres, a facing 12 of the plastic composition of the present invention, and a thin binding layer 11 of magnesium oxychloride cement.

To apply the material to the insulating board 10 the surface of the board 10 is first lightly coated with magnesium oxychloride cement and rubbed to raise the fibers, after which the facing 12 of plastic material is applied to the board 10 by means of pressure rollers.

The composition of the present invention may be applied to textile or wire fabric by means of pressure rolls in substantially the same way that rubber is applied to fabrics, and the sheet material so formed may be bent or molded to the desired form before it hardens. To accelerate the hardening the material may be passed through a drying oven heated to 100° F. or less.

The use of magnesium oxychloride cement compositions in the manufacture of molded articles has been limited because of the fact that it has been necessary to leave the material in the molds for a considerable period of time while the cement is setting. The composition of the present invention eliminates this disadvantage because of the fact that the plastic material retains its form and it is only necessary to employ the mold to impart the desired shape to the article, so that only a relatively small number of molds are necessary for manufacturing operations.

To facilitate the handling of the plastic material of the present invention and to prevent the material from sticking to the hands or to molds, rolls or the like, a small quantity of oil may be mixed with the material. A mineral oil such as Vaseline may be used and will make the hardened material water repellent. Where the material is to be adhered to material such as insulation board it is preferred to use a drying oil such as tung oil or linseed oil. A quantity of linseed oil ½% to 1% of the total weight, will prevent the material from sticking to the fingers, to rollers or to the mold upon hardening of the material, makes the material water repellent and does not interfere with adhesion of the hardened composition to a surface to which it has been applied.

It is to be understood that the particular form of product shown and described and the particular procedure set forth are presented for purposes of explanation and illustration and that various modifications of said product and procedure can be made without departing from my invention as defined in the appended claims.

What I claim is:

1. A moldable self-hardening plastic composition comprising rye flour mixed with one to three times its weight of powdered magnesite and with a sufficient amount of a concentrated magnesium chloride solution to form a dough-like mass.

2. A moldable self-hardening plastic composition comprising rye flour mixed with one to three times its weight of powdered magnesite, and with a sufficient amount of magnesium chloride solution, 22° to 25° Baumé, to form a dough-like mass.

3. A moldable self-hardening plastic composition comprising rye flour mixed with from one to three times its weight of powdered magnesite a powdered filter and a sufficient amount of a concentrated magnesium chloride solution to form a dough-like mass.

4. A moldable self-hardening plastic composition comprising rye flour mixed with one to three times its weight of powdered magnesite with a sufficient amount of magnesium chloride solution, 22° to 25° Baumé, to form a dough-like mass, and a small amount of linseed oil.

5. A moldable self-hardening plastic composition comprising rye flour mixed with about twice its weight of magnesite and about twice its weight of plaster of Paris, and with sufficient magnesium chloride solution, 22° to 25° Baumé, to form a dough-like mass.

6. A moldable self-hardening plastic composition comprising rye flour mixed with about twice its weight of magnesite and about twice its weight of plaster of Paris, with sufficient magnesium chloride solution, 22° to 25° Baumé, to form a dough-like mass, and linseed oil in an amount of from ½% to 1% of the weight of the mix.

7. A wall board comprising a sheet of fibrous material and a facing adhered to the surface of the fibrous sheet and formed by the hardening of a plastic composition composed of rye flour mixed with one to three times its weight of powdered magnesite, a filler and sufficient concentrated magnesium chloride solution to form a dough-like mass.

8. A wall board comprising a sheet of fibrous material and a facing adhered to the surface of the fibrous sheet and formed by the hardening of a plastic composition composed of rye flour mixed with about twice its weight of powdered magnesite, about twice its weight of plaster of Paris and with sufficient magnesium chloride solution (22° to 25° Baumé) to form a dough-like mass.

MAX SKOLNIK.

REFERENCES CITED

The following references are of record in the file of this patent:

UNITED STATES PATENTS

| Number | Name | Date |
| --- | --- | --- |
| 932,098 | Bell | Aug. 24, 1909 |
| 1,190,942 | Nienstaedt | July 11, 1916 |
| 2,182,535 | Britton | Dec. 5, 1939 |
| 2,200,155 | Camp et al. | May 7, 1940 |

FOREIGN PATENTS

| Number | Country | Date |
| --- | --- | --- |
| 807 | Great Britain | Feb. 14, 1883 |
| 5,079 | Great Britain | June 21, 1911 |
| 101,136 | Australia | June 3, 1937 |

OTHER REFERENCES

Dow Plastic Magnesia Cements, Dow Chemical Co., Midland, Mich. (1927); pages 116 and 117,